July 11, 1961  D. P. GRETTIE  2,992,247
DEFATTING ANIMAL SKINS

Filed Aug. 7, 1958  2 Sheets-Sheet 1

DONALD P. GRETTIE
INVENTOR.

BY R. G. Story
Attorney

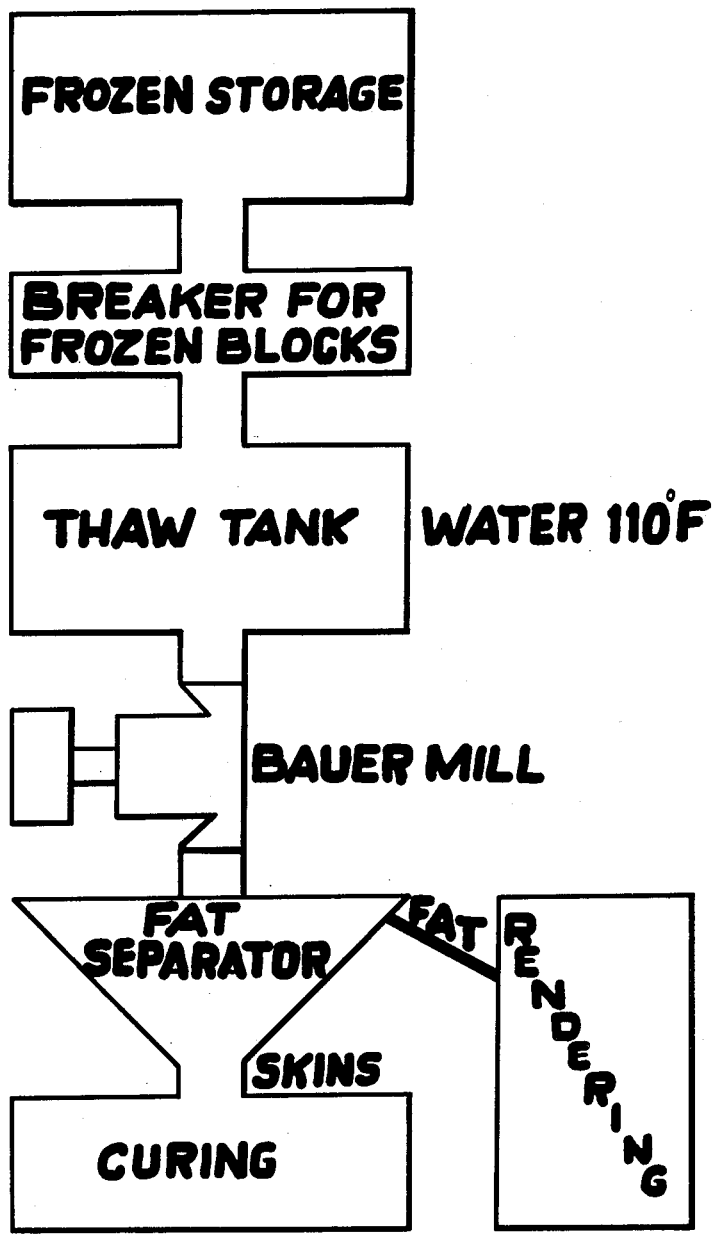

United States Patent Office 2,992,247
Patented July 11, 1961

2,992,247
DEFATTING ANIMAL SKINS
Donald P. Grettie, Chicago, Ill., assignor to Swift & Company, Chicago, Ill., a corporation of Illinois
Filed Aug. 7, 1958, Ser. No. 753,780
10 Claims. (Cl. 260—412.6)

This invention relates to the preparation of stock for gelatin manufacture. More particularly, animal skins are subjected to a shearing force to remove substantially all the adhering fatty tissue.

The highest grade of gelatin produced commercially is derived from animal skins, and particularly pork skins, a by-product of the packing industry. The skins are removed from various areas of the hog carcass with layers of fatty or adipose tissue attached. The larger portions of the skins not suited for producing leather have traditionally been used in gelatin manufacture. However, today, due to an ever increasing demand for gelatin, it is necessary to use the smaller pieces known as trimmings.

To obtain a high grade gelatin, substantially all the fatty tissue must be removed prior to processing the skins. An excess of fat adhering to the skins prevents proper penetration of curing agents used in the processing, interferes with extraction of gelatin from the skins, and results in the process of fat emulsions in the gelatin liquors making it difficult or impossible to obtain a solution of good clarity.

Hog skins to be utilized for production of gelatin are shipped to the processing plant in frozen blocks weighing from about 80 to about 100 pounds. The blocks are placed in a large vat of warm water and agitated until thawed; the thaw water is drained and replaced with an acid curing solution. After complete penetration of the skins, the curing solution is drained and three applications of wash water are used to remove excess acid. The cured and washed skins are then placed in large cooking kettles where the gelatin is leached out by about eight successive applications of water at temperatures increasing with each application.

During the normal processing of skins for gelatin, liquids must be drained from them about thirteen times. Therefore, together with the necessity that the skins be essentially free from fat is the need for the skin pieces to be of a size allowing rapid and efficient drainage.

It has been the practice in the industry to defat the gelatin skins by various means, such as rendering, skinning or fleshing, hashing or grinding, or by subjecting the skins to repeated impacts. Rendering has been found unsatisfactory since the temperature essential to liquefy the fat results in removing also a considerable portion of the gelatin from the skins. Consequently, the fat is contaminated and the gelatin reduced in amount.

In the fleshing or skinning method, it is customary to employ apparatus which comprises two rollers, one of which is fitted with sharp-edged spiral corrugations. Large pieces of hog skin such as back or side skins are grasped firmly by hand and fed into the machine. When the fat from one end of the strip of skin has been removed, the skin is pulled from the rollers and the opposite end is inserted. Obviously, this procedure is expensive in labor costs. Furthermore, only large pieces of skin may be defatted in this manner since there must be sufficient skin to grasp safely by hand. It has also been found that, due to the sharp corrugations, a considerable amount of the corium layer of the skin is removed together with the fat.

To overcome these labor costs and to allow use of smaller pieces of skin and trimmings, the hashing method was developed in which skins are put through a device similar to a meat grinder. The pieces are subdivided to a size of about ¼ inch in diameter and subjected to a semi-rendering in water at a temperature of about 120° F. Aside from the expense of the process, and a flotation step necessary to free the fat from the corium, the fine subdivision needed to achieve separation has presented several complications which limit use of the procedure to a greater extent. A substantial amount of corium is hashed so fine that it floats away with the fat and is lost. Then, too, the finely divided skins pack closely in the large curing and extraction vats. The cure tends to be nonuniform since it is difficult to distribute the curing agent uniformly throughout such a packed mass. Drainage of liquors from a large vat of closely packed material is very slow and difficult and results in loss of time and deterioration of the product. Whereas the liquors from a cooking kettle of larger pieces of skin (1 inch in diameter and up) may be drained in about 15 or 20 minutes, several hours are required to drain a kettle of hashed skins.

The difference in results from processing hashed skins and larger pieces of skin cannot be shown entirely by figures. Nonuniformly cured skins, such as obtained by hashing, do not extract as well as fully cured skins so that less high test gelatin is obtained in the first low temperature extraction. This causes the average quality of gelatin from the hashed skins to be lower. Since the undercured pieces do not extract fully even at high temperatures, the yield of gelatin from hashed skins is lessened. Solutions of gelatin extracted from uncured or undercured skins have an opalescent appearance and cannot be clarified. A comparison of the quality of gelatin obtained from well fleshed whole skins and that of hashed skins is shown in the following table.

| Quality of Gelatin | From Whole Skin | From Hashed Skin |
|---|---|---|
| Jelly strength (average 7 runs), gms. | 270 | 255 |
| Viscosity (average 7 runs), M.P. | 55 | 50 |

The most recent prior development in the art of removing fat from pork skins is the impact method wherein skin pieces in the order of one inch in diameter are subjected to repeated beatings or impacts to mechanically disintegrate the adhering fat. It is necessary that substantially all skins and trimmings be cut in a machine known as a prebreaker before they may be processed in the disintegrator. It has been found that, since a positive clearance may not be effectively established in an impact disintegrator, there is a tendency of the skin pieces to be rolled and tumbled causing skin tissue to be frayed from the edges thereof. Furthermore, the fatty tissue of skin pieces larger than about 1 inch in cross section is removed efficiently from only the edges of the pieces, leaving the fatty tissue at the center untouched or only partially removed unless the pieces are allowed to remain under impact for a relatively long time. This nonuniform removal of fatty tissue and fraying of the edges of the skin pieces causes uneven curing of the skins and reduces the quality of the resulting gelatin. Thus, the criticality in the size of skins which may be impacted results in an increase of time and expense in either prebreaking the skins into more or less uniformly small pieces or subjecting the skins to lengthy impacting in the disintegrator.

The method of this invention avoids the above-mentioned difficulties and disadvantages and is particularly adapted to large scale operations. While the primary application of this invention for commercial reasons is in the processing of hog skins, it is to be understood that the method hereinafter described may be effectively utilized with any animal skins having an attached layer of adipose tissue.

It is an object of this invention to provide an economical, automatic and continuous method whereby fatty tissue may be separated from animal skins to produce a skin fraction of very low fat concentration and corresponding high protein and moisture content.

It is a further object of this invention to provide a method for the separation of fat from comparatively large pieces of skins allowing uniform action of curing agents and rapid drainage of liquors.

It is a still further object of this invention to provide a method for separating adipose tissue from animal skins wherein substantially all trimmings may be utilized without prebreaking.

It is another object of this invention to provide a positive separation of fat from skins whereby there is uniform removal of fat without corresponding loss of corium or skin.

It is still another object of this invention to provide a method for removing fat from animal skins wherein no additional steps such as rendering are necessary for efficient separation.

Additional objects, if not specifically set forth herein, will be readily apparent to those skilled in the art from the following description of the invention.

We have found a method which removes the fatty tissue without the expensive hand labor of the fleshing method or the fine subdivision necessary in the hashing process, and one which achieves uniform removal of fatty tissue from the entire surface of larger skin pieces than may be efficiently impacted. Broadly speaking, the method of this invention relates to the subjecting of animal skins to a shearing force. Preferably, apparatus is used wherein a positive clearance may be achieved in a milling chamber or zone between complementary surfaces having motion relative to one another. The operation is rapid and continuous, each piece of skin passing through the milling zone only once. A lubricant is preferably run through the apparatus concurrently with the skin pieces to facilitate passage of the skins and improve fat separation. Alternatively, the skins may be subjected to the action of a single surface having movement relative to the skins, the inertia of the skins being sufficient to allow a shearing force to be exerted thereon.

More particularly, in my preferred method the skin pieces are fed into a machine having a milling chamber comprising closely spaced complementary surfaces having motion relative to one another and exerting a shearing force upon the skin pieces passed therebetween. The milling chamber of our apparatus comprises complementary rotor and stator plates or disks adapted to exert a shearing or abrading force on material passed therebetween. Preferably, the plates are provided with fine radial grooves although other abrading means such as concentric rows of fine teeth may be employed. The distance between the plates may be closely regulated to a clearance such that the fatty tissue is sheared off as the skin pieces pass therebetween. The lubricant, preferably water, which is preferably fed through the milling zone concurrently with the skin pieces, may be cold or warm. Somewhat better fat separation is obtained if the water is warm enough to melt the fat. An example of apparatus suitable for use in the preferred process hereinafter described is the Attrition Mill manufactured by the Bauer Brothers Company, catalog number 245.

The invention will be readily understood by reference to the drawings.

FIGURE 2 is a schematic view of the various steps of the process.

Figure 1:
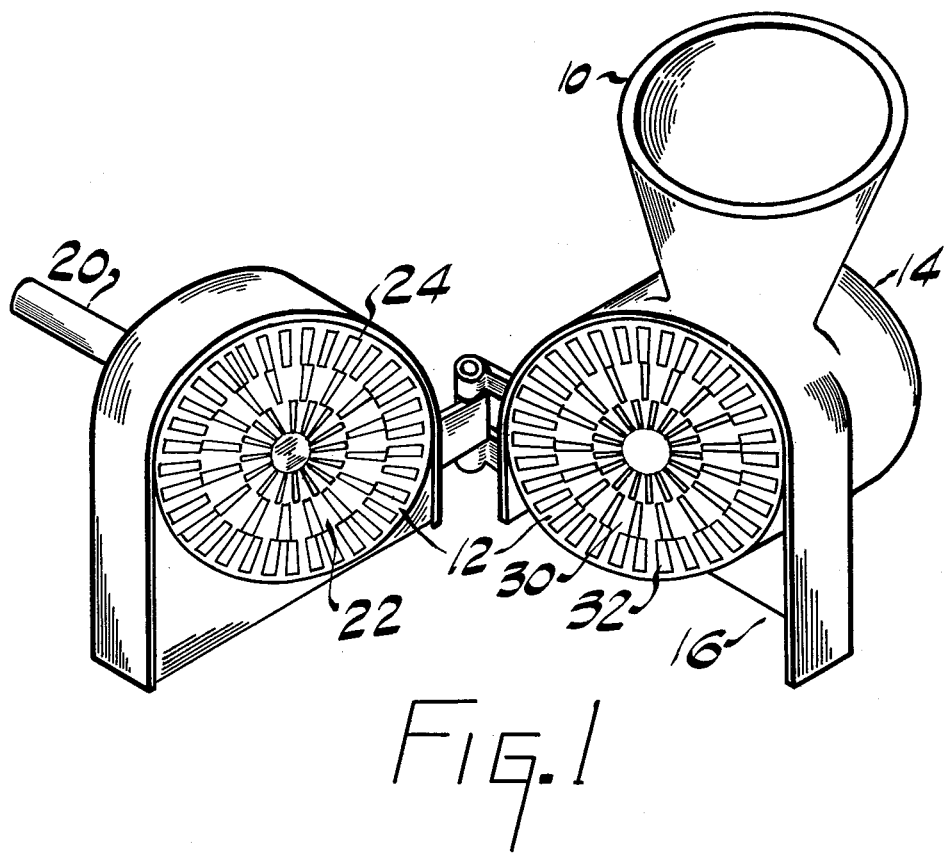
FIGURE 1 is an isometric view of a shearing apparatus suitable for use in our process, the milling chamber being open to show the rotor and stator plates.

The apparatus illustrated in FIGURE 1 includes a gravity feed inlet hopper 10 opening into a milling chamber, generally 12, surrounded by a casing 14, which leads into a discharge outlet 16. Fixedly attached to horizontal shaft 20 and driven by a power means not shown is a rotatable plate or rotor 22 disposed generally vertically and containing a plurality of grooves 24 spaced radially to the axis of shaft 20. Positioned opposite rotor 22 is a stationary plate or stator 30 also having radial grooves 32. The distance between rotor 22 and stator 30 is adjustable by means not shown associated with shaft 20 to allow controlled horizontal movement of the shaft 20 and rotor 22 relative to stator 30.

Such a mill is used for various grinding and pulping operations. However, for the present purposes the machine is used to shear rather than to cut or grind, the cutting section being substantially eliminated by setting the distance between the plates within a predetermined range hereinafter described.

The Bauer Mill is conveniently available in sizes having plate diameters of 8 inches, 18 inches, 24 inches, and 36 inches. Because of limitations of piece size and production rate, the smaller mill is less desirable for our purposes, but the mill carrying the 18-inch diameter plates has a production rate of about 7,000 pounds of skin pieces per hour, that of the 24-inch plate is approximately 10,000 pounds per hour, and that of the 36-inch plate is up to 60,000 pounds per hour. Using the Bauer Mill, it is possible to work with skin pieces varying in size from ½ inch to correspondingly larger pieces as the plate diameter is increased. Actually, any size piece of skin which will pass between the plates without curling or rolling but which will not dwell too long is satisfactory. Tests using the various sizes of mills indicate the size limitations shown in the following table:

| Plate Size | Piece Size (Longest Dimension) | |
|---|---|---|
| | Minimum, inches | Maximum, inches |
| 8 inches | ½ | 2 |
| 18 inches | ½ | 6 |
| 24 inches | ½ | 12 |
| 36 inches | ½ | 18 |

A limited number of smaller or larger pieces than prescribed above may be processed without serious difficulty. The ability to use larger skin pieces by this process is desirable since many trimmings need not be precut prior to defatting. For example, with the 36-inch mill, sizes up to the normal size of back skins as removed from the hog, namely 8 inches by 18 inches, can be handled quite well.

The speed of rotation of the rotor is variable and limited only by demands of centrifugal force necessary to carry the skin pieces between the plates, and by power requirements and mechanical construction. For example, with a mill carrying 18-inch plates, it has been found that a peripheral speed of from about 100 revolutions per minute to about 2,000 revolutions per minute and preferably a speed of about 1,800 revolutions per minute is satisfactory for our purpose since it will result in an efficient shearing action on the fatty tissue with little or no damage to the skin tissue.

Skin pieces from different areas of a hog carcass differ in thickness. In determining the most satisfactory clearance between plates to effectively process all skin pieces, this fact was taken into consideration and test runs using the thinnest belly skins and the heaviest back skins were conducted. The results are shown in the following table.

THIN BELLIES

| Clearance | Fat, percent | Loss Protein Basis Skin, percent |
|---|---|---|
| Original skin | 13.4 | 0 |
| .14 inch | 3.0 | 1.0 |
| .155 inch | 3.1 | .3 |
| .17 inch | 4.5 | .3 |
| .185 inch | 4.9 | .3 |

HEAVY BACKS

| | | |
|---|---|---|
| Original skin | 55.5 | 0 |
| .14 inch | 5.2 | .3 |
| .155 inch | 7.1 | .3 |
| .17 inch | 8.5 | .3 |
| .185 inch | 9.1 | .3 |

Since at a clearance of .14 inch, the loss of protein material is negligible, we have found in practice that this setting gives optimum results.

In carrying out the present invention as indicated in the schematic drawing of FIGURE 2, frozen blocks of skins from storage are fed into a suitable cutter to break up the block and cut the skins into pieces if necessary. The cut up skins are placed in a thaw tank and mixed with water at about 110° F. to thaw. They are then pumped to the Bauer Mill, wherein a shearing action is exerted on the skins to separate the fatty issue from the corium. The separated material passes out of the mill and into a fat separator which takes advantage of the difference in densities of the fat and the skins in that the skins being heavier than water will settle to the bottom and the fat will rise and can be floated off. The skins are continuously removed from the bottom of the separator by a suitable means such as a screw conveyor and are preferably washed in water at about 120° F. to achieve a further separation of fat. The skins are then cured and extracted, and the fat may be rendered.

The following examples are given to illustrate how my invention may be practiced and are not intended to limit the scope of the invention:

*Example I*

Hog belly skins were cut into 2-inch squares and passed through the laboratory size 8-inch Bauer Mill with cold water. The distance between the rotor and stator was set at .14 inch.

```
                                                    Percent
Fat content of original skins_____25.2
Fat content of skins after
    passing through the Bauer Mill_____10.0
Fat content of milled skins after
    washing with 120° F. water_____5.0
```

*Example II*

Hog belly skins cut into 2-inch squares were passed through an 8-inch Bauer Mill with cold water and the plate clearance of .14 inch. The milled skins were given a warm water wash.

```
                                                    Percent
Fat content of original skins_____35
Fat content of milled skins_____9
```

*Example III*

Hog belly skins were cut into pieces varying in size from ½ inch to 6 inches in cross section and passed through an 18-inch Bauer Mill with cold water. The plate clearance was .14 inch.

```
                                                    Percent
Fat content of original skins_____16
Fat content of skins after passing
    through the Bauer Mill_____4.5
```

*Example IV*

Back skins from medium heavy hogs cut to pieces of from ½ inch to 6 inches in cross section were passed through an 18-inch Bauer Mill with cold water and a plate clearance of .14 inch.

```
                                                    Percent
Fat content of original skins_____60
Fat content of skins after passing
    through the Bauer Mill_____9.1
```

*Example V*

Hog belly skins cut to pieces varying in size from 2 inches to 12 inches in cross section were passed through a 36-inch Bauer Mill with warm water and a plate clearance of .14 inch.

```
                                                    Percent
Fat content of original skins_____30
Fat content of skins after passing
    through the Bauer Mill_____9.5
```

The above defatted skins were cured with acid and extracted. The gelatin obtained was of unusual clarity and quality. The term gelatin used in the specification includes edible and inedible varieties; for example, a common edible variety is that used in the manufacture of gelatin desserts, and a usual type of inedible variety is that employed as a source of glue.

It is clear that many modifications and variations of the invention as hereinbefore set forth may be made without departing from its spirit and scope, and therefore only such limitations should be imposed as are indicated in the appended claims.

I claim:

1. A method for separating the fat attached to at least one surface of animal skins without cutting the skins substantially comprising subjecting both surfaces of said skins to the action of a rotative shearing force whereby said skins are moved relative to said shearing force to remove the fat from said skins without substantially cutting said skin surfaces.

2. A method for separating the fat attached to at least one surface of animal skins without cutting the skins substantially comprising contacting said skins with a lubricant and subjecting both surfaces of said skins to the action of a rotative shearing force whereby said skins are moved relative to said shearing force to remove the fat from said skins without substantially cutting said skin surfaces; and separating the removed fat from said skins.

3. A method for separating the fat attached to at least one surface of animal skins without cutting the skins substantially comprising contacting said skins with a lubricant and subjecting the surfaces of said skins to the action of a rotative shearing force, said force being exerted by complementary surfaces having movement relative to one another to remove the fat from the skins without substantially cutting said skin surfaces; contacting said skins with a liquid to separate the removed fat from said skins; and washing said skins in water of about 120° F.

4. A method for separating the fat attached to at least one surface of animal skins without cutting the skins substantially comprising forming the skins into pieces from about ½ inch to about 18 inches longest dimension; subjecting both surfaces of said skins to the action of a rotative shearing force whereby said skins are moved relative to said shearing force to remove the fat from said skins without substantially cutting said skin surfaces.

5. A method for separating the fat attached to at least one surface of animal skins without cutting the skins substantially comprising forming the skins into pieces from about ½ inch to about 18 inches longest dimension; subjecting the surfaces of said skins to the action of a rotative shearing force, said force being exerted by complementary surfaces having movement relative to one another to remove the fat from the skins without substantially cutting said skin surfaces; and separating the removed fat from said skins.

6. A method for separating the fat attached to at least one surface of animal skins without cutting the skins substantially comprising forming the skins into pieces from about ½ inch to about 18 inches longest dimension; subjecting the skins to a rotative shearing force, said force being exerted by complementary surfaces having movement relative to one another to remove the fat from the skins, said skins being left substantially uncut; contacting said skins with a liquid to separate the removed fat from said skins; and washing said skins in water of about 120° F.

7. A method for separating the fat attached to at least one surface of animal skins without cutting the skins substantially comprising forming the skins into pieces from about ½ inch to about 18 inches longest dimension; contacting said skins with a lubricant and subjecting the skins to a rotative shearing force, said force being exerted by complementary surfaces having movement relative to one another to remove the fat from the skins, said skins being left substantially uncut; contacting said skins with a liquid to separate the removed fat from said skins; and washing said skins in water of about 120° F.

8. A method for separating the fat attached to at least one surface of animal skins without cutting the skins substantially comprising forming the skins into pieces from about ½ inch to about 18 inches longest dimension; subjecting said pieces to the action of a rotative shearing force, said force being exerted by complementary positively-spaced surfaces at least one of which having movement relative to the interface of the fat and said skins to free the fat from said skins, said skins being left substantially uncut.

9. A method for separating the fat attached to at least one surface of animal skins without cutting the skins substantially comprising forming the skins into pieces from about ½ inch to about 18 inches longest dimension; subjecting said pieces to a rotative shearing force, said force being exerted by complementary positively-spaced surfaces having movement relative to one another to free the fat from the skins without substantially cutting the skin surfaces; the space between said surfaces being from about 0.14 inch to about 0.185 inch.

10. A method for separating the fat attached to at least one surface of animal skins without cutting the skins substantially comprising forming said skins into pieces from about ½ inch to about 18 inches longest dimension; contacting said pieces with a lubricant and subjecting said pieces to a rotative shearing force, said force being exerted by complementary positively-spaced surfaces at least one of which having movement relative to the interface of the fat and said skins to free the fat from said skins, said skins remaining substantially uncut, the space between said surfaces being from about 0.14 inch to about 0.185 inch; contacting said skins with a liquid to separate the removed fat from said skins; and washing said skins with water of about 120° F.

References Cited in the file of this patent

UNITED STATES PATENTS

| | | |
|---|---|---|
| 2,580,049 | Sifferd et al. | Dec. 25, 1951 |
| 2,665,853 | Nicholson | Jan. 12, 1954 |
| 2,697,112 | Kramer | Dec. 14, 1954 |
| 2,742,488 | Dufault | Apr. 17, 1956 |
| 2,748,152 | Siffered et al. | May 29, 1956 |
| 2,828,018 | Chayen | Mar. 25, 1958 |

UNITED STATES PATENT OFFICE
CERTIFICATE OF CORRECTION

Patent No. 2,992,247                                    July 11, 1961

Donald P. Grettie

It is hereby certified that error appears in the above numbered patent requiring correction and that the said Letters Patent should read as corrected below.

Column 1, line 26, for "process" read -- presence --; column 2, line 9, for "greater" read -- great --.

Signed and sealed this 28th day of November 1961.

(SEAL)
Attest:

ERNEST W. SWIDER                                    DAVID L. LADD
Attesting Officer                                       Commissioner of Patents

USCOMM-DC